United States Patent [19]

Barnett

[11] Patent Number: 5,509,675

[45] Date of Patent: Apr. 23, 1996

[54] BICYCLE FRONT SUSPENSION SYSTEM

[76] Inventor: Robert L. Barnett, 2090 Meyer Pl., Costa Mesa, Calif. 92627

[21] Appl. No.: 335,268

[22] Filed: Nov. 7, 1994

[51] Int. Cl.$^6$ .................................................. B62K 25/08
[52] U.S. Cl. .......................... 280/276; 188/269; 188/289; 188/314
[58] Field of Search .................................. 280/276, 277, 280/278, 279; 188/269, 289, 314

[56] References Cited

U.S. PATENT DOCUMENTS 4,057,264  11/1977  Suzuki et al. ........................... 280/276

*Primary Examiner*—Mitchell J. Hill
*Attorney, Agent, or Firm*—Roy A. Ekstrand

[57] ABSTRACT

A bicycle front suspension system includes a pair of V-shaped strut supports secured to a bicycle head tube in a spaced apart arrangement. Each strut support receives and secures the upper portion of a collapsible suspension strut to provide increased suspension travel. The lower end of each suspension strut is secured to the axle of a bicycle front wheel in a clamping action which increases the strength of the cycle front suspension. Each strut includes an oil dampened air spring mechanism in which the compression and rebound characteristics of the strut are independently adjustable.

9 Claims, 3 Drawing Sheets

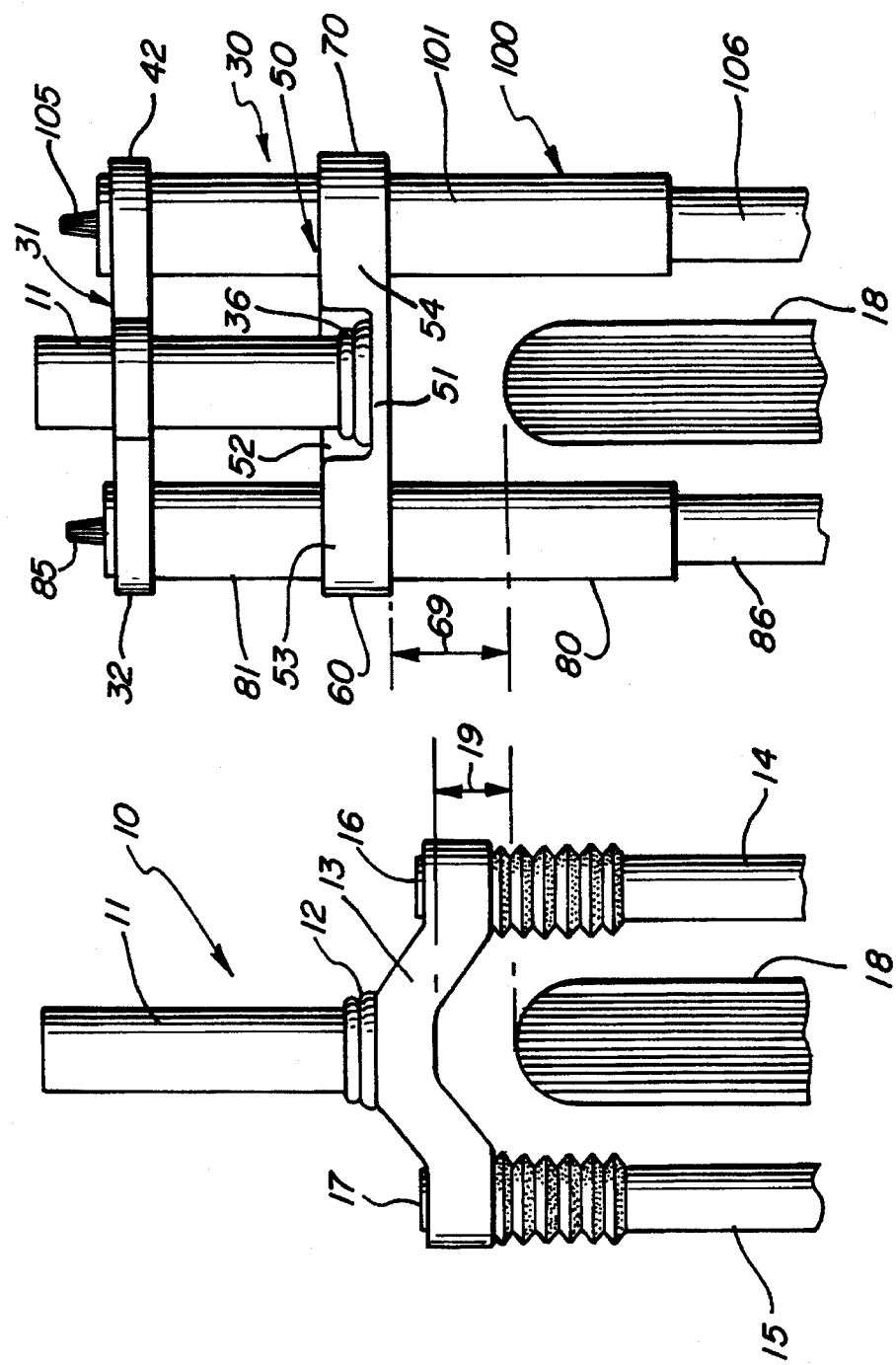

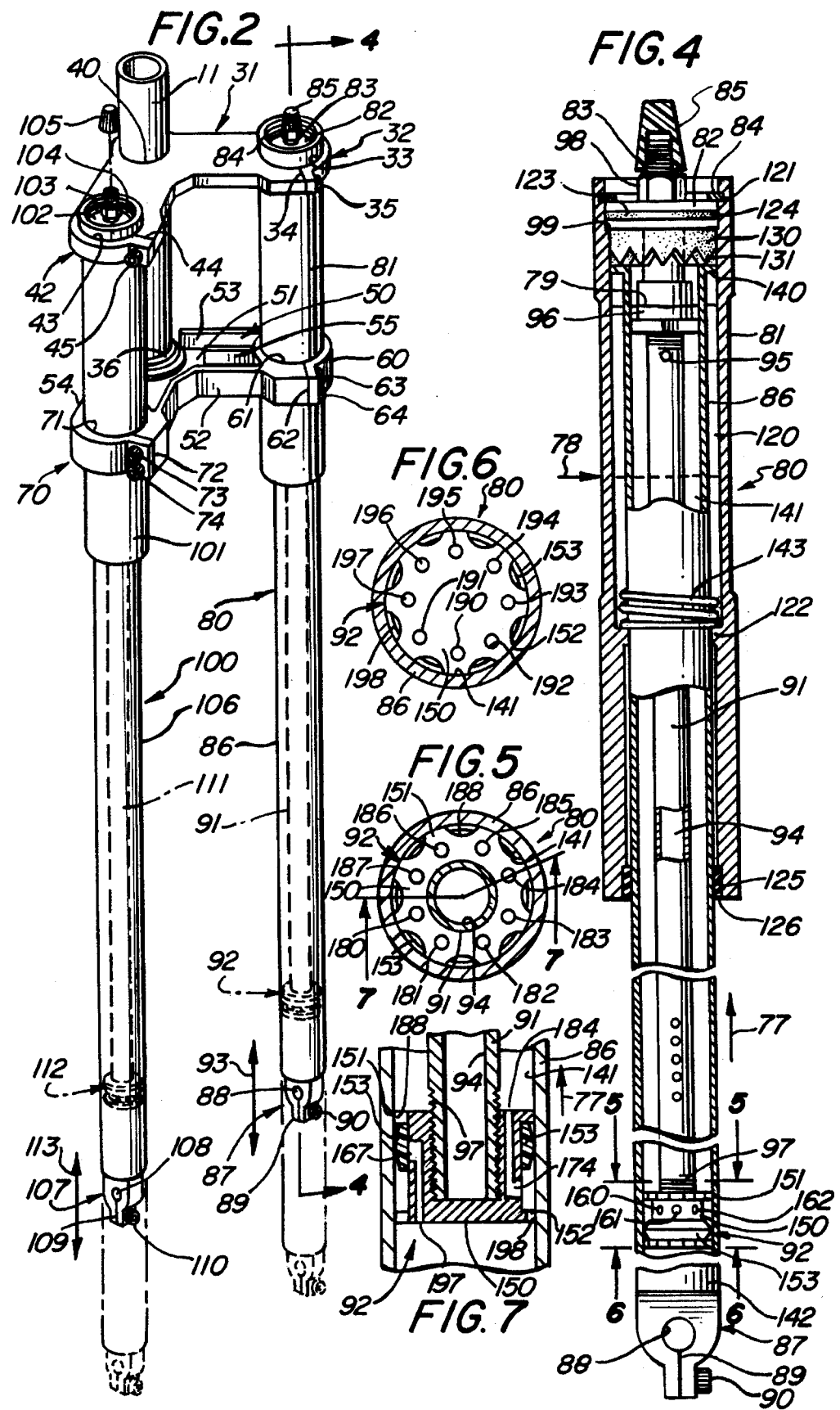

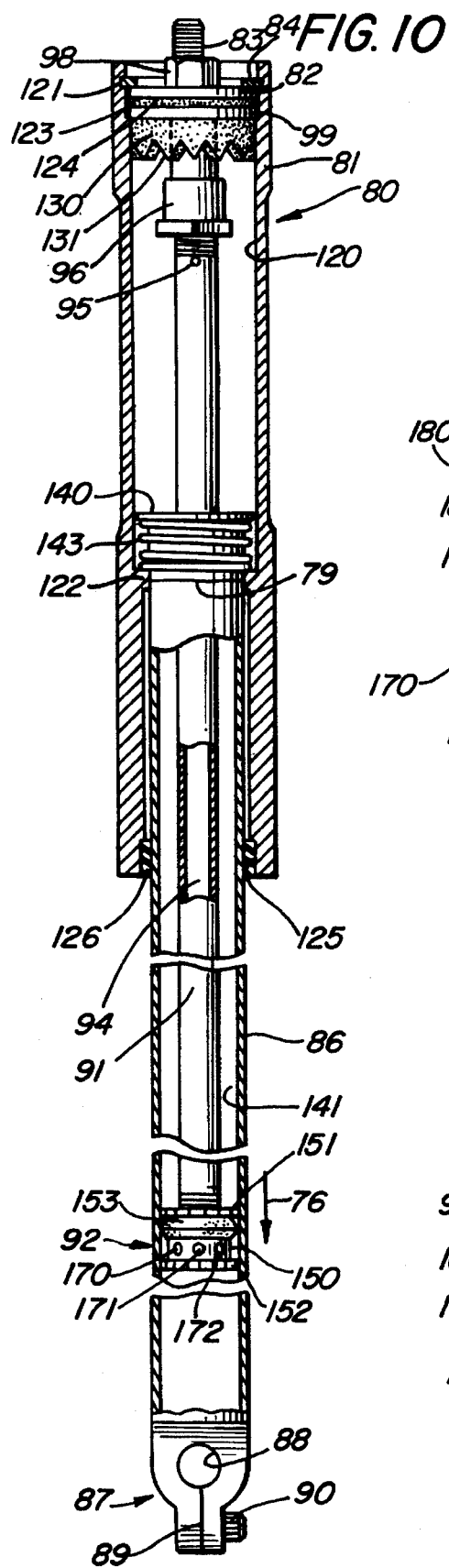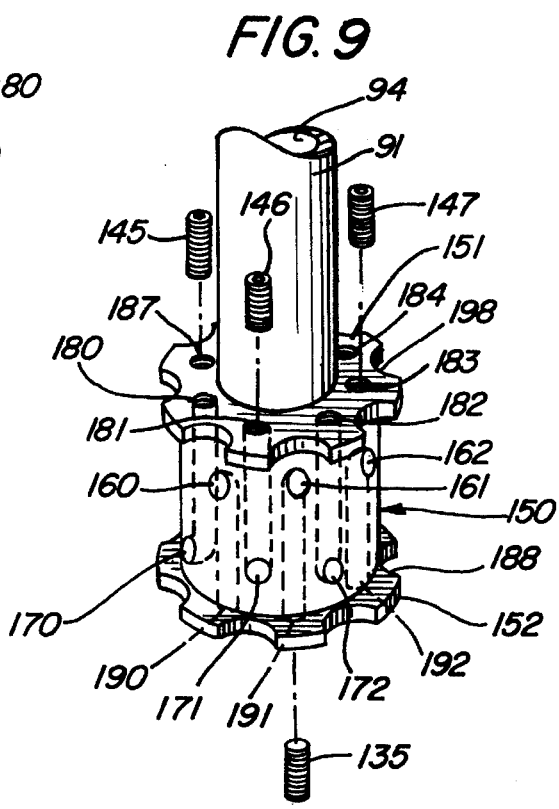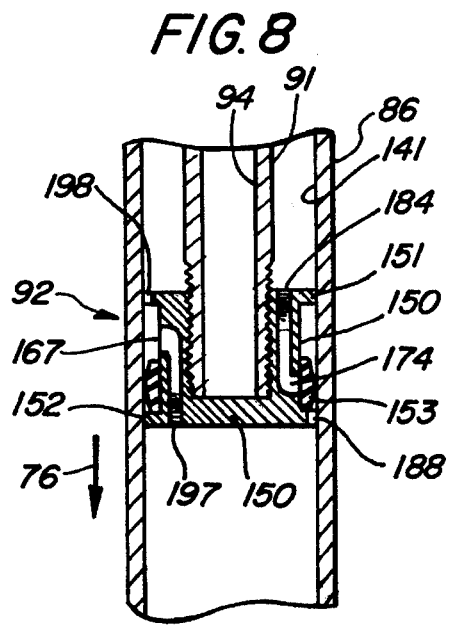

5,509,675

BICYCLE FRONT SUSPENSION SYSTEM

FIELD OF THE INVENTION

This invention relates generally to bicycle front suspension systems and particularly to those used on bicycles such as "mountain bikes" or other bicycles utilized on rough terrain.

BACKGROUND OF THE INVENTION

The sport of mountain biking as it is generally known has become extremely popular with a broad range of bicycle enthusiasts. While a variety of events have evolved which form various facets of the sport of mountain biking, basically mountain biking differs from other bicycle and cycling activities in its application to rough terrain, hilly terrain, and difficult trails or paths through wooded areas or the like. The sport is physically challenging for the enthusiast and provides increased simulation for the mountain biker due to the constantly varying circumstances presented to the mountain biker. In addition to providing physical beneficial exercise and sport or recreation activities, various facets of mountain biking have become extremely competitive often in an organized amateur or professional format.

Not surprisingly, the typical bicycle utilized in mountain biking (usually called a mountain bike) differs from standard cycles used in pleasure riding or road racing activities. Several different aspects are most noticeable in distinguishing mountain bikes from other cycles. For example, the frame is substantially stronger and more rigid and is due to weight considerations often fabricated of relatively exotic metals and materials. Further, the typical mountain bike utilizes wider tires having more aggressive treads and provides derailleur systems which provide substantially more gear ratios to meet the anticipated hilly terrain of the mountain biker. In addition, the front wheel and often the rear wheel as well are supported by energy absorbing dampened suspension systems.

Such mountain bikes suspension systems are subject to the same operational criteria as has been encountered in other vehicle suspension systems such as motorcycles and automobiles in a general sense. That is to say, the various characteristics by which a suspension system is described include the comfort provided, the energy absorbing capability, control maintenance, as well as steering and general "feel". In addition, mountain bikes encounter an additional characteristic in that the attitude or inclination of the bike must be carefully controlled. These various qualities of suspension systems are often at odds or conflicting. For example, the degree of energy absorption and the maintenance of control are often conflicting requirements. Similarly, the ability to absorb energy within the system and the maintenance of bike attitude or inclination also conflict. By further example, the quality of comfort often conflicts with the qualities of road feel and control maintenance.

Of particular interest to the present invention is the front suspension system for such mountain bikes. In attempting to meet these various needs, practitioners in the art have in general arrived at various levels and combinations of compromises between suspension qualities. The most typical front suspension structure employs a pair of dampened spring struts which support front wheel axle and extend upwardly to be secured to a pivoting strut support pivotally coupled to the head tube of the bicycle frame.

FIG. 1 sets forth a rear view of a typical front fork and suspension assembly for a prior art mountain bike generally referenced by numeral 10. For purposes of illustration, FIG. 1 omits various apparatus such as the brake assembly or the like to avoid unduly cluttering the figure. Thus, in accordance with conventional fabrication techniques, front fork and suspension assembly 10 includes a horizontally extending strut support 13 having a cup assembly 12 pivotally coupling strut support 13 to a head tube 11. The latter is secured to and forms a part of the bicycle frame. Strut support 13 includes attachments 16 and 17 at each end thereof and defines a generally inverted U-shape member. A pair of suspension struts 14 and 15 are secured at their upper ends to strut support 13 by attachments 16 and 17 respectively and extend downwardly to receive the front axle of a front wheel 18 (not shown). Front wheel 18 is, as a result, spring supported by dampened struts 14 and 15. FIG. 1 depicts the typical "normal" riding position for front fork and suspension system 10 and the corresponding position of front wheel 18 relative thereto. As front wheel 18 encounters various bumps and obstacles tending to raise the bike, front wheel 18 is driven upwardly causing struts 14 and 15 to compress initially in an energy absorbing action which is dampened by the struts. The distance available for front wheel 18 to move upwardly as struts 14 and 15 compress is shown as suspension travel limit distance 19. Due to the strength required for attachments 16 and 17 to struts 14 and 15 of a mountain bike, strut support 13 is necessarily fabricated of a high strength relatively thick member. This in turn substantially limits the available suspension travel distance for front wheel 18.

The travel distance available for a bicycle front suspension forms a basic limitation on the capability of the suspension system to properly perform. In addition, the operation and characteristics of the dampened struts form an additional defining characteristic for the front suspension system. In addition, the overall strength and rigidity provided by the front wheel suspension system of a mountain bike further limits the performance capability of the bike.

While the prior art mountain bike suspension systems have performed adequately under many operating conditions, there remains nonetheless a continuing need in the art for evermore improved lightweight and high strength mountain bike front suspension systems.

SUMMARY OF THE INVENTION

Accordingly, it is a general object of the present invention to provide an improved mountain bike front suspension system. It is a more particular object of the present invention to provide an improved front suspension system which increases the strength and rigidity of the front suspension system while improving the energy absorbing and control aspects of the system. It is a still more particular object of the present invention to provide an improved front suspension system which utilizes a pair of dampened spring struts having improved performance and capability.

In accordance with the present invention, there is provided for use in a bicycle having a front wheel and axle and a head tube, a front suspension comprises: an upper strut support coupled to the head tube and having upper strut attachment means; a lower strut support coupled to the head tube beneath and spaced from the upper strut support, the lower strut support having lower strut attachment means; and a pair of suspension struts each having upper and lower telescoping portions movable between compressed and extended positions, the upper portions being secured to the upper and lower strut attachment means and the lower portions having axle securing ends for securing a front wheel axle.

BRIEF DESCRIPTION OF THE DRAWING

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a partial rear view of a prior art mountain bike front suspension and fork assembly;

FIG. 2 sets forth a front perspective view of the present invention front fork and front suspension assembly;

FIG. 3 sets forth a partial rear view of the present invention front fork and front suspension system;

FIG. 4 sets forth a section view of a suspension strut constructed in accordance with the present invention taken along section lines 4—4 in FIG. 2 in the fully collapsed position;

FIG. 5 sets forth a section view of the strut of FIG. 4 taken along section lines 5—5 therein;

FIG. 6 sets forth a section view of the strut of FIG. 4 taken along section lines 6—6 therein;

FIG. 7 sets forth a section view of the strut valve assembly of the present invention taken along section lines 7—7 in FIG. 1 during strut collapsing motion;

FIG. 8 sets forth a section view of the valve assembly of the present invention strut taken along section lines 7—7 in FIG. 5 during strut rebound;

FIG. 9 sets forth a partial perspective assembly view of the valve assembly of the strut of the present invention; and FIG. 10 sets forth a section view of the strut of the present invention suspension system taken along section lines 4—4 in FIG. 2 showing the strut in the full rebound position.

DESCRIPTION OF THE PREFERRED EMBODIMENT

FIG. 2 sets forth a front perspective view of a bicycle front suspension and fork assembly generally referenced by numeral 30. Suspension system 30 includes an upper strut support 31 having a generally V-shaped configuration and defining an aperture 40 which receives a head tube 11. Upper strut support 31 includes a strut clamp 32 at one end thereof formed by an aperture 33 and a split seam 34 extending outwardly from aperture 33. A fastener 35 is secured to the end portion of strut clamp 32 and extends beyond split 34. Thus, fastener 35 is able to open or narrow split 34 to provide a clamping action within aperture 33. Upper strut support 31 further includes a second strut clamp 42 at the opposite end thereof formed by an aperture 43 having a split seam 44 extending outwardly therefrom. In a similar manner to strut clamp 32, strut clamp 44 includes a fastener 45 which extends beyond split seam 44 and is thus able to open or narrow split seam 44 and provide a clamping action within aperture 43.

Suspension system 30 further includes a lower strut support 50 also formed in a generally V-shape and supporting a cup 36 which is secured to the lower end of head tube 11. Lower strut support 50 is formed of a relatively thin generally planar member 51 together with upwardly extending walls 53 and 54 on each side of cup 36. An interior wall 52 extends along the frontal edge of planar member 51 and a pair of inwardly extending reinforcing ribs such as rib 55 extend inwardly and are joined to planar member 51. Lower strut support 50 further includes a strut clamp 60 at one end thereof formed by an aperture 61 having an outwardly extending split seam 62. Strut clamp 60 is substantially thicker than strut clamps 32 and 42 of upper strut support 31 and as a result utilizes a pair of fasteners 63 and 64 threadably received within strut support 50 to provide opening or closing of split 62. Lower strut support 50 further includes a second strut clamp 70 formed of an aperture 71 having an outwardly extending split seam 72. In similarity to strut clamp 60, strut clamp 70 utilizes a pair of fasteners 73 and 74 due to its thicker structure to provide opening and closing of split seam 72.

Suspension system 30 further includes a pair of substantially identical dampened spring struts 80 and 100 secured within upper strut support 31 and lower strut support 50. Struts 80 and 100 are identical and function in an identical manner to provide suspension spring action and dampening of front wheel motion in accordance with the present invention. Strut 80 is set forth and described in great detail in FIGS. 4 through 10. It will be understood that while the structure and operation of strut 100 is not set forth below in such detail, strut 100 is identical to strut 80 and thus the descriptions and FIGS. 4 through 10 applicable to strut 80 should be understood to be equally descriptive and applicable to strut 100.

More specifically, strut 80 includes an outer tube 81 received within apertures 33 and 61 of strut clamps 32 and 60. Outer tube 81 is secured to upper strut support 31 and lower strut support 50 by adjusting fasteners 35, 63, and 64 of strut clamps 32 and 60 respectively. Strut 80 further includes a head 82 providing closure of outer tube 81 and a securing ring 84 which maintains head 82. Head 82 further supports a conventional air valve 83 having a valve cap 85 secured thereto. Strut 80 further includes a hollow inner tube 86 received within outer tube 81 and extending downwardly therefrom. An axle clamp 87 is formed at the lower end of inner tube 86 and includes an aperture 88 having a split seam 89 extending downwardly therefrom. A fastener 90 extends through split seam 89 to provide clamping action upon aperture 88. In its anticipated use, aperture 88 receives one side of a front wheel axle for supporting the bicycle front wheel and securing strut 80 to the front wheel. In accordance with an important aspect of the present invention, the use of axle clamp 87 having fastener 90 for securing the lower end of inner tube 86 of strut 80 to the front wheel axle in a secure attachment provides additional strength for the front wheel suspension system and fork assembly.

Strut 80 further includes a valve tube 81 extending downwardly from head 82 of outer tube 81 into the interior of inner tube 86 in the manner set forth below in greater detail. Suffice it to note here however that valve tube 91 supports a dampening valve 92 which in accordance with an important aspect of the present invention provides independently adjustable collapse and rebound dampening action. Thus, as is set forth below in greater detail, strut 80 absorbs energy and provides a responsive suspension action by allowing inner tube 86 to move up and down in the directions indicated by arrow 93 with respect to outer tube 81. This action is set forth below in greater detail. However, suffice it to note here that in accordance with the present invention, a quantity of oil is received within the interior of inner tube 86 and is acted upon by valve 92 as strut 80 collapses and rebounds. In addition and in further accordance with the present invention, a quantity of pressurized air is injected into outer tube 81 beneath head 82 using valve 83 to form an air spring operative as strut 80 is collapsed and rebounds in suspension action.

As mentioned above, strut 100 is identical to strut 80 and operates in an identical manner. Thus, strut 100 includes an outer tube 101 received within apertures 43 and 71 of strut clamps 42 and 70 respectively. A head 102 is secured to the upper end of outer tube 101 by a retaining ring 104. Head 102 supports a conventional air valve 103 having a valve cap 105 securable thereto. Outer tube 101 is secured to upper strut support 31 using strut clamp 42 by tightening fastener 45 and to lower strut support 50 by using strut clamp 70 and tightening fasteners 73 and 74. Strut 100 further includes an inner tube 106 extending upwardly into outer tube 101 and having an axle clamp 107 at the lower end thereof. Axle clamp 107 is identical to axle clamp 87 of strut 80 and thus includes an aperture 108 having a split seam 109 extending therefrom which is opened and closed using a fastener 110. Strut 100 further includes a valve tube 111 extending downwardly from head 102 into inner tube 106. Valve tube 111 supports a valve 112 identical to valve 92 of strut 80.

In accordance with an important aspect of the present invention, the use of upper strut support 31 and lower strut support 50 to secure struts 80 and 100 provides substantially improved strength of the present invention front suspension and fork assembly. In addition, the combination of upper strut support 31 and lower strut support 50 facilitates the use of a substantially thinner lower strut support member for strut support 50 having planar member 51. As a result and as is better seen in FIG. 3, the present invention front suspension significantly improves the suspension travel distance available for the present invention system. This in turn greatly improves the suspension characteristics of the overall system while maintaining greater strength than prior art systems. In further accordance with the present invention, the secure clamping of axle clamps 87 and 107 to the front wheel axle (not shown) further increases the overall strength of the front suspension and fork assembly of the present invention.

FIG. 3 sets forth a partial rear view of the present invention front suspension system for use in comparison to the prior art system shown in FIG. 1. As will be apparent to those skilled in the art, the present invention system substantially increases the suspension travel distance over the prior art system in FIG. 1. More specifically, suspension system 30 includes an upper strut support 31 and a lower strut support 50 secured to a head tube 11. A pair of struts 80 and 100 include outer tubes 81 and 101 respectively which are received within strut clamps 32 and 60 and strut clamps 42 and 70 of upper strut support 31 and lower strut support 50. Struts 80 and 100 include downwardly extending inner tubes 86 and 106 respectively which are secured to a front axle (not shown) of a conventional front wheel 18.

It will be apparent to those skilled in the art by comparing FIGS. 1 and 3 in which head tube 11 and front wheel 18 are positioned in an identical manner in both FIGS. 1 and 3 that a substantially greater suspension travel distance 69 is provided by the present invention system as shown in FIG. 3 when compared to suspension travel distance 19 provided by the prior art system shown in FIG. 1. Thus, the present invention system provides an improved suspension travel distance without disturbing the relative positions of head tube 11 and wheel 18. Accordingly, this improved suspension travel distance is obtained through the use of combined strut supports 31 and 50 without changing the height or attitude of the host bike. This improved or increased suspension travel distance provided by the present invention system allows substantially greater suspension characteristics to be obtained than are realizable with the prior art systems.

FIG. 4 sets forth a section view of strut 80 taken along section lines 4—4 in FIG. 2. It should be noted that FIG. 4 depicts strut 80 in the fully collapsed position. Strut 80 includes a generally cylindrical outer tube 81 having a groove 121 formed at the upper end thereof and a lip 99 spaced downwardly from groove 121. Lip 99 receives a generally cylindrical head 82 having an annular groove 123 formed therein which receives a resilient seal 124. Head 82 rests upon lip 99 and is secured at the upper end of outer tube 81 by the insertion of retaining ring 84 into groove 121. Retaining ring 84 may, for example, comprise a conventional snap ring or other removable retaining ring device. Outer tube 81 defines an interior bore 120 having an annular lip 122 extending inwardly thereof. Bore 120 is slightly smaller in diameter beneath annular lip 122 and terminates in a groove 125 at the lower end thereof. Groove 125 receives an annular seal 126. A rebound spring 143 is received within bore 120 and rests upon annular lip 122.

Strut 80 further includes an elongated cylindrical inner tube 86 defining an interior bore 141 and an outwardly extending lip 140. Lip 140 is formed at the upper end of inner tube 86 and is sized to fit closely within bore 120. Rebound spring 143 is sized to be smaller than lip 140 for reasons set forth below in greater detail. Inner tube 86 terminates at its lower end in a closed end 142 and a downwardly extending axle clamp 87. Axle clamp 87 defines an aperture 88 having a split seam 89 extending downwardly therefrom. A fastener 90 is threadably received within axle clamp 87 and is operative to close or open split 89 to provide a secure clamp to the front axle of the bicycle front wheel (not shown).

Strut 80 further includes an elongated cylindrical valve tube 91 defining an interior bore 94 and a threaded end 97. Threaded end 97 is secured to a valve 150, the structure of which is set forth below in FIG. 9 in greater detail. Suffice it to note here, however, that valve body 150 defines an upper flange 151 and a lower flange 152 as well as a plurality of apertures 160, 161 and 162. A seal ring 153 defines a generally annular resilient ring encircling valve body 150 and slidable thereupon. Flanges 151 and 152 captivate seal ring 153 upon valve body 150. Seal ring 153 and valve body 150 cooperate to provide a valve 92 which as is described below in greater detail provides independently adjustable collapse and rebound dampening action for strut 80. Valve tube 91 further defines an upper end coupled to the lower end of valve 83 by a fitting 96. A small aperture 95 extends through the wall of valve tube 91 and into bore 94.

In accordance with the present invention, a quantity of oil is received within bore 120 of outer tube 81 and bore 141 of inner tube 86. In addition, a quantity of pressurized air is introduced into the interior of strut 80 through valve 83 forming a pocket of pressurized air within bores 120 and 141 of outer tube 81 and inner tube 86. In the position shown in FIG. 4, strut 80 is fully collapsed and as a result oil surface 79 of the oil quantity within strut 80 assumes the approximate position shown in FIG. 4. By further result of the collapsed position of strut 80, the air trapped above oil surface 79 is maximally pressurized and is fully captivated between oil surface 79 and head 82. In addition as strut 80 collapses and inner tube 86 travels upwardly within bore 120 of outer tube 81, lip 140 contacts bumper 130 as strut 80 bottoms out. In accordance with an important aspect of the present invention, bumper 130 forms a bottom out spring fabricated of a resilient material and having a plurality of downwardly extending generally triangular teeth 131. Bumper 130 is captivated between lip 140 and the undersurface of head 82 and thus maintains a position between the undersurface of head 82 and lip 140. As a result each time strut 80 is fully collapsed, bumper 130 provides a bottom out resilient cushion to avoid a harsh bottom out characteristic.

In its normal operation, that is in the absence of a severe suspension load sufficient to cause the full collapse of strut 80 shown in FIG. 4, the air pressure above oil surface 79 provides a support cushion of pressurized air between surface 79 and the undersurface of head 82 which displaces oil surface 79 and inner tube 86 downwardly within outer tube 81 extending strut 80 and causing oil surface 79 to assume an intermediate position such as that shown as dashed-line level 78. In this position, the pressurized air above the oil surface provides a cushioning spring commonly referred to as an air spring. This spring is adjustable by varying the air pressure injected through valve 83. Thus, under normal riding conditions, increased loads upon strut 80 cause inner tube 86 to move upwardly within bore 120 of outer tube 81 raising the level of oil surface 79 and producing increased air pressure within strut 80. Correspondingly, a decreased load upon strut 80 causes the pressurized air within strut 80 to force oil surface 79 downwardly and thereby extend inner tube 86 outwardly from outer tube 81 and extend strut 80.

In accordance with an important aspect of the present invention, the movements of inner tube 86 relative to outer tube 81 under varying load conditions are subjected to a dampening action due to the structure of valve 82. Valve 82 is set forth below in greater detail. However, suffice it to note here that valve 82 defines a number of internal passages which restrict the oil flow through and about valve body 150 of valve 92 as valve 92 is moved within bore 141. In accordance with a further important aspect of the present invention, the dampening characteristic created by valve 92 is independently adjustable for collapsing movements or movements in which inner tube 86 moves upwardly with respect to outer tube 81 and rebounding or extending motions of strut 80 in which inner tube 86 moves downwardly from outer tube 81. This independent adjustment is achieved by utilizing the movement of seal ring 153 upon valve body 150 of valve 92. For example, as inner tube 86 moves upwardly in the direction indicated by arrow 77, the friction between seal ring 53 and the interior of bore 141 causes ring 153 to slide downwardly upon valve body 150 covering the lower set of oil passage apertures formed therein and exposing the upper set of oil passage apertures such as apertures 160 through 162. Thus, by adjusting the number of oil passage apertures through which oil is able to flow through valve body 150 with seal ring 153 at the position shown at FIG. 4 facilitates the adjustment of the compression dampening characteristic of strut 80.

Conversely and with temporary reference to FIG. 10 in which the opposite direction motion of inner tube 86 in the direction indicated by arrow 76 is shown, seal ring 153 is moved upwardly upon valve body 150 closing the upper set of apertures such as apertures 160 through 162 and exposing the lower set of oil flow apertures such as apertures 170 through 172. Thus, during rebound or extension of strut 80, the number of lower oil passage apertures formed in valve body 150 able to carry oil flow controls the dampening action of strut 80 during extensions or rebound action.

In accordance with a further advantage of the present invention, a small aperture 95 is formed in the upper portion of valve tube 91 providing a limited air flow passage into bore 94. As is better seen in FIG. 7, the bottom end of bore 94 is closed and thus bore 94 defines a closed end passage accessible solely through aperture 95. Aperture 95 provides a important function as strut 80 is rapidly compressed or collapsed and the captive air above oil surface 79 is rapidly compressed. In prior art devices having air springs, it has been found that an undesirable harshness or sharpness in spring action occurs near the fully collapsed position of the air spring strut. In the present invention structure, the use of aperture 95 together with bore 94 formed in valve tube 91 provides a secondary air chamber which slowly absorbs abrupt pressure rises within the primary air chamber formed in outer tube 81. Because of the restrictive size of aperture 95, the pressure within bore 94 requires additional time to equalize with the pressure in outer tube 81 above oil surface 79. Of particular importance is the resulting softening of air pressurization during rapid compression of strut 80 as air pressure is somewhat slowly equalized through aperture 95 and into bore 94. The effect of this softening of the air spring characteristic of strut 80 avoids the harsh abrupt spring characteristic encountered by prior art air spring devices.

FIG. 5 sets forth a section view of strut 80 taken along section lines 5—5 in FIG. 4. As described above, strut 80 includes a generally cylindrical inner tube 86 defining an interior bore 141. Strut 80 also includes a cylindrical valve tube 91 defining an interior bore 94 and supporting a dampening valve 92. Valve 92 includes a valve body 150 (seen in FIG. 4) having an upper flange 151 and a lower flange 152 (seen in FIG. 4). An annular seal ring 153 is captivated between flanges 151 and 152. Valve body 150 defines a plurality of generally circular oil passages 180 through 187 evenly spaced about valve body 150. As is better seen in FIG. 9, valve body 150 further defines a plurality of lower apertures such as apertures 170 through 172 seen in FIG. 9 at the end of each of oil passages 180 through 187. In addition, upper flange 150 defines a plurality of inwardly extending notches 188 interleaved between oil passages 180 through 187.

FIG. 6 sets forth a section view of strut 80 taken along section lines 6—6 in FIG. 4. As described above, strut 80 includes a generally cylindrical inner tube 86 defining a bore 141 therein. As is also described above, strut 80 includes a valve 92 having a valve body 150 supporting a seal ring 153 within bore 141. Valve body 150 defines a lower flange 152 having a plurality of oil passages 190 through 197 evenly spaced about flange 152. As is better seen in FIG. 9, each of oil passages 190 through 197 terminates in an upper aperture formed in valve body 150 such as apertures 160 through 162 which correspond to oil passages 190 through 192 respectively.

With simultaneous reference to FIGS. 5 and 6, it should be noted that notches 198 formed in lower flange 152 and notches 188 formed in upper flange 151 are offset to accommodate the offset positioning of oil passages 190 through 197 and oil passages 180 through 187. As is better seen in FIG. 9, this permits the offset positioning of the upper and lower rows of oil passage apertures such as apertures 160 through 162 and apertures 170 through 172.

FIG. 7 sets forth a partial section view of strut 80 taken along section lines 7—7 in FIG. 5. As described above, strut 80 includes an inner tube 86 having an interior bore 141 which receives a valve tube 91 having a bore 94 formed therein. Strut 80 further includes a valve 92 having a valve body 150 which threadably receives a threaded end 97 of valve tube 91. Valve body 150 defines an upper flange 151 and a lower flange 152. Upper flange 151 defines a plurality of notches 188 and a plurality of downwardly extending oil passages such as oil passage 184 which terminate in respective apertures such as aperture 174 on the lower portion of valve body 150. Valve 150 further defines a plurality of upwardly extending oil passages such as oil passage 197 which terminate in a plurality of upper apertures such as aperture 167. A resilient annular seal ring 153 is slidably received upon valve body 150 and captivated between flanges 151 and 152. Seal ring 153 is configured to frictionally engage bore 141 of inner tube 86 and thereby be moved to either the position shown in FIG. 7 or, alternatively, the position shown in FIG. 8 as inner tube 86 moves with respect to valve tube 91. In the position shown in FIG. 7, inner tube 86 is moving upwardly in the direction indicated by arrow 77 collapsing or compressing strut 80. Correspondingly, the friction between seal ring 153 and bore 141 moves seal ring 153 to the upper position shown in FIG. 7 causing seal ring 153 to cover and block the upper row of apertures formed in body 150 such as aperture 167 as well as apertures 160 through 162 shown in FIG. 9. It should be recalled that the upper set of apertures formed in valve body 150 are coupled to oil passages such as oil passage 197 which extend upwardly from the bottom of valve body 150. Thus, as strut 80 is compressed moving inner tube 86 upwardly in the direction indicated by arrow 77, the oil within bore 141 flows past valve body 150 solely through notches 198 formed in lower flange 152, and upwardly through oil passages 180 through 187 via the lower set of oil passage apertures such as aperture 174 which is coupled to oil passage 184. Because seal ring 153 covers the upper set of apertures formed in valve body 150 such as aperture 167, oil flow through oil passages 190 through 197 is prevented.

FIG. 8 sets forth the section view of FIG. 7 in which valve 92 responds to the rebound or extending motion of strut 80 in which inner tube 86 moves downwardly in the direction indicated by arrow 76. During rebound the friction between seal ring 153 and bore 141 slides 153 to the lower position upon valve body 150 shown in FIG. 8. With seal ring 153 positioned in this manner, the lower set of oil passage apertures such as apertures 170 through 172 shown in FIG. 9 and aperture 174 shown in FIG. 8 are blocked by seal ring 153 preventing oil flow through oil passages 180 through 187. Conversely, with seal ring 153 moved downwardly upon valve body 150, the upper set of apertures of valve body 150 are open and oil is able to flow past valve body 150 through oil passages 190 through 197 and notches 198 formed in upper flange 151.

Thus, with simultaneous reference to FIGS. 7 and 8, it should be noted that during compression motion of strut 80 as depicted in FIG. 7, oil flows solely through oil passages 180 through 187 while during rebound or extension of strut 80 as shown in FIG. 8, oil flows solely through passages 190 through 197. Thus, in accordance with an important aspect of the present invention, the oil flow pads past valve body 150 for compression and rebound are entirely separate due to the action of seal ring 153 in blocking either the upper or lower set of oil passage apertures. As a result, the resistance or dampening offered by valve 92 during compression or rebound may be separately controlled by adjusting the resistance to oil flow offered in each direction of motion.

FIG. 9 sets forth a partial perspective view of valve body 150 of valve 92 together with an exemplary set of oil passage closure plugs. As described above, valve body 150 defines a generally cylindrical member supported upon the lower end of valve tube 91. Valve body 150 includes an upper flange 151 defining a plurality of equally spaced notches 198 and a lower flange 152 defining a plurality of equally spaced notches 188. Valve body 150 further defines a plurality of downwardly extending oil passages 180 through 187 each terminating in a lower oil passage aperture near lower flange 152. While all oil passage apertures are not visible in FIG. 9 due to the perspective view thereof, it will be understood by those skilled in the art that each of the oil passages 180 through 187 terminates in a similarly located oil passage aperture. For example, oil passage 180 terminates in aperture 170 while oil passages 181 and 182 terminate in apertures 171 and 172 correspondingly. Similarly, a second set of oil passages 190 through 197 (seen in FIG. 6) extend upwardly through valve body 150 and terminate in respective upper oil passage apertures such as apertures 160 through 162. It should be equally well understood that while the perspective view of FIG. 9 does not show the oil passage apertures for oil passages 193 through 197, such apertures correspond directly to the arrangement shown for oil passages 190 through 192 having apertures 160 through 162 respectively.

In accordance with an important aspect of the present invention, oil passages 180 through 187 and oil passages 190 through 197 (the latter seen in FIG. 6) define interior threads and thus are able to receive threaded plugs to provide closure of each oil passage at the user's choice. In the example shown in FIG. 9, a plurality of threaded plugs 145, 146 and 147 are assembled into oil passages 187, 181 and 183 respectively providing closure of these oil passages. Similarly, a threaded plug 135 is threadably received within oil passage 191 in a similar manner. Thus, the user is able to adjust the compression and rebound characteristics of strut 80 by simply selecting the number of oil passages to be closed using threaded plug inserts as shown in FIG. 9. As a result, the user is able to increase the stiffness or dampening resistance of valve 92 by increasing the number of oil passages closed by threaded plugs therein or, conversely, to decrease dampening resistance by removing threaded plugs and opening a greater number of oil passages. Because the dampening action of strut 80 during compression is controlled entirely by oil passages 180 through 187, the user is able to control compression dampening by applying the appropriate number of plugs to oil passages 180 through 187. Since the rebound dampening characteristic of strut 80 is controlled entirely by oil passages 190 through 197, the user is able to independently control the rebound characteristic of strut 80 by applying the desired number of threaded plugs to oil passages 190 through 197. This facilitates completely independent adjustment of compression and rebound dampening characteristics for strut 80 and provides substantial advantage in adjusting or tuning the suspension system.

FIG. 10 set forth a section view of strut 80 taken along section lines 4—4 in FIG. 2 in which strut 80 is fully extended in the rebound direction. With temporary to FIG. 4 in which the structure of strut 80 is fully described, it should be recalled that FIG. 4 shows strut 80 in the fully compressed position characterized by the movement of inner tube 86 upwardly into outer tube 81 until lip 140 thereof is brought into contact with bumper 130 against the undersurface of head 82. In such case, the position of oil surface 79 is raised within bore 120 of outer tube 121 and the captive air beneath head 82 and above oil surface 79 is maximally pressurized. Returning to FIG. 10, the structure of strut 80 remains the same with inner tube 86 maximally extended downwardly from outer tube 81. Thus, as inner tube 86 travels downwardly in the direction indicated by arrow 76, lip 140 is brought into contact with rebound spring 143 compressing spring 143 against the upper edge of annular lip 122. Correspondingly, the increased volume within strut 80 provided by the downward movement of inner tube 86 lowers oil surface 79 to the approximate position shown in FIG. 10. It should be noted that in accordance with the above-described operation of valve 92, the downward motion of inner tube 86 moves seal ring 153 upwardly upon valve body 150 exposing the lower set of oil passage apertures therein such as apertures 170, 171 and 172. Rebound spring 143 operates during severe rebound loads imposed upon strut 80 to cushion the rebound impact and absorb additional energy to prevent harsh rebound action as strut 80 extends. One of the most common types of operational situations in which such severe rebound or extension of strut 80 occurs is that commonly referred to a "wheel drop" which as the name applies occurs during circumstances in which the front portion of the mountain bike is completely airborne allowing the front suspension to extend downwardly in an abrupt manner due to the pressurized air within the strut and the weight of the front wheel upon the struts. It has been found advantageous to provide rebound spring 143 within strut 80 and strut 100 (seen in FIG. 2) to greatly alleviate the objectionable character of such severe rebound during wheel drop.

As mentioned previously, retaining ring 84 is preferably fabricated of a snap ring type construction which facilitates the removal of retaining ring 84 from groove 121. This ability to remove retaining ring 84 permits the user to reconfigure valve 92 as desired without otherwise disassembling the bike suspension. Thus, in accordance with an important aspect of the present invention, the user may at any time simply remove retaining ring 84 and thereafter draw out the assembly comprised of valve tube 94, valve 92, fitting 96, head 82, nut 98, and valve 83 drawing the assembly upward from within bores 141 and 120 of inner tube 86 and outer tube 81 respectively. With this assembly withdrawn, the user is provided with complete access to the oil passages within valve body 150 of valve 92 and may add or remove the desired number of threaded plug inserts to adjust the dampening characteristics for compression and rebound needed to meet the particular terrain and conditions which the mountain biker anticipates encountering. Thereafter, the present invention strut is reassembled by simply reinserting the previously withdrawn assembly into tubes 81 and 86. It should be noted that under most circumstances, the captive air within the upper portion of strut 80 will be relatively high in pressure and thus the user would most likely open valve 83 to release any air pressure within strut 80 prior to disassembly. Correspondingly, once strut 80 has been reassembled with the appropriate valve adjustment having been made, the user may then repressurize strut 80 using valve 83 and virtually any source of compressed air. As a result, repairs and adjustments of the present invention front suspension system are rendered relatively trouble-free and easy giving the mountain biker substantial flexibility to meet varying trail conditions.

What has been shown is an improved bicycle front suspension system particularly adapted to the challenging demands of mountain bikes and similar types of cycles. The front suspension provided includes a pair of inverted struts having oil dampening and air pressure spring mechanisms therein which are secured to the bike head tube by a pair of V-shaped strut supports to provide increased strength and increased suspension travel. The front suspension system shown utilizes a dampening valve having independently adjustable compression and rebound characteristics as well as a secondary air chamber used to reduce the harshness or sharpness of the air spring during full compression.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in a bicycle having a front wheel and axle and a head tube, a front suspension comprising:

an upper strut support coupled to said head tube and having upper strut attachment means;

a lower strut support coupled to said head tube beneath and spaced from said upper strut support, said lower strut support having lower strut attachment means;

a pair of suspension struts each having upper and lower telescoping portions movable between compressed and extended positions, said upper portions being secured to said upper and lower strut attachment means and said lower portions having axle securing ends for securing a front wheel axle and each of said suspension struts including oil dampening means for resisting telescoping motion of said upper and lower telescoping portions and valve means for independently controlling the resistance to telescoping motion produced by said oil dampening means in the compressing and extending directions, said valve means including:

a valve body having upper and lower surfaces and a side surface;

a first plurality of oil passages each extending into said valve body from said lower surface and exiting said valve body at said side surface proximate said upper surface;

a second plurality of oil passages each extending into said valve body from said upper surface and exiting said valve body at said side surface proximate said lower surface; and a seal ring slidable upon said side surface of said valve body for closing said first plurality of oil passages during compressing motion of said telescoping portions and closing said second plurality of oil passages during extending motion thereof.

2. A front suspension system as set forth in claim 1 wherein said axle securing ends each include an aperture formed to receive one end of an axle and a clamp for clamping one end of an axle within said aperture.

3. A front suspension system as set forth in claim 2 wherein said upper and lower telescoping portions are hollow and wherein said oil dampening means includes a hollow valve tube having a one end secured to said upper telescoping portion and a remaining end extending through said upper telescoping portion into said lower telescoping portion and a valve supported upon said lower end.

4. A front suspension as set forth in claim 3 wherein each of said suspension struts includes a pressurized air volume within said upper telescoping portions.

5. A front suspension as set forth in claim 4 wherein said hollow valve tube defines an aperture proximate said one end secured to said upper telescoping portion.

6. A front suspension as set forth in claim 5 wherein each of said suspension struts interposed further includes a rebound spring between said upper and lower telescoping portions and compressed when said telescoping portions approach their maximum extending positions.

7. A front suspension as set forth in claim 6 wherein each of said suspension struts further includes a bottom-out bumper formed of a resilient member coupled to said upper telescoping portion and compressed when said telescoping portions approach their maximum compressed positions.

8. A front suspension as set forth in claim 8 wherein said hollow valve tubes support said valves and each hollow valve tube includes means for removable attachment to said upper telescoping portions of said suspension struts.

9. A front suspension as set forth in claim 1 wherein at least some of said oil passages are threaded and wherein said valves each include at least one threaded plug receivable within said threaded passages.

* * * * *